United States Patent [19]

Giesselmann et al.

[11] 4,203,378
[45] May 20, 1980

[54] SEWING MACHINE WITH DATA CIRCUITS

[75] Inventors: Hannes Giesselmann; Kenneth Skogward, both of Huskvarna, Sweden

[73] Assignee: Husqvarna Aktiebolag, Huskvarna, Sweden

[21] Appl. No.: 810,946

[22] Filed: Jun. 29, 1977

[30] Foreign Application Priority Data

Jul. 7, 1976 [SE] Sweden .................... 7607750

[51] Int. Cl.² .................... D05B 3/02; D05B 75/00
[52] U.S. Cl. .................... 112/158 E; 112/258

[58] Field of Search ......... 112/158 E, 121.11, 121.12, 112/275, 277, 258; 339/17 R, 17 N; 318/567, 569

[56] References Cited

U.S. PATENT DOCUMENTS

| 4,021,734 | 5/1977 | Ott | 339/176 MP X |
| 4,052,946 | 10/1977 | Rydz et al. | 112/158 E |
| 4,055,131 | 10/1977 | O'Brien et al. | 112/158 E |

Primary Examiner—Peter P. Nerbun
Attorney, Agent, or Firm—Holman & Stern

[57] ABSTRACT

A sewing machine has an electronic control system for providing selected fancy patterns, the system including a replaceable memory store unit which plugs into a recess formed in the outer front surface of the machine.

1 Claim, 2 Drawing Figures

SEWING MACHINE WITH DATA CIRCUITS

The present invention relates to a sewing machine, preferably for domestic use, and more particularly, although not exclusively, to such a sewing machine having a high capacity and a wide variation of fancy and plain seams.

Domestic sewing machines are known in which static, semi-conductor memory stores having control circuits for zig-zag and feed mechanisms are provided for producing fancy stitches in accordance with information read into the memory store. From a technical point of view, these sewing machines can be divided into a mechanical part and an electronic part. It is advantageous to consider these parts individually, both from the aspects of manufacture and from the servicing aspect. An individual consideration of these two parts is also advisable from the aspect of development, since in this way part of the electronic system can be replaced or supplemented without necessitating undue modification of the machine or excessive work thereon.

The present invention affords a solution to the problem of assembling a multiplicity of electronic units having static semi-conductor memory stores and control circuits in a system to enable the possible variations in the making of fancy patterns to be increased. In accordance with the invention such a system has the characterizing features of a unit which is detachably mounted on the machine and including a memory or part thereof for code words for an arbitrary number of seam patterns.

An exemplary embodiment of the invention will now be described with reference to the accompanying drawings, in which.

Figure 1:
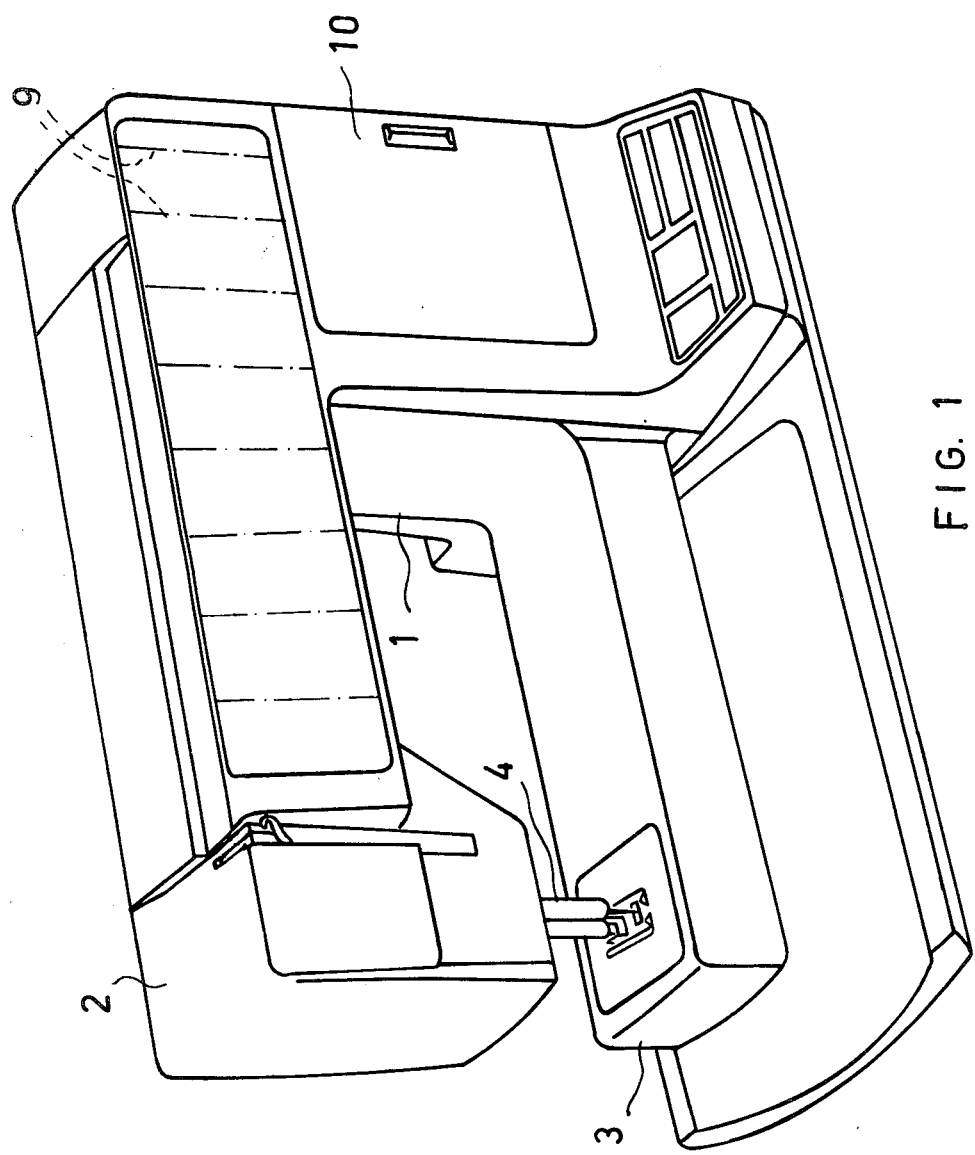
FIG. 1 shows a sewing machine according to the invention.

A sewing machine comprising mechanical and electronic major components is illustrated in perspective in FIG. 1. The mechanical components include those known in conventional sewing machines, such as a post 1, an over and under arm 2 and 3 respectively, drive means and transmission means. Incorporated in the under-arm is a cloth feed device, while a zig-zag mechanism is incorporated in the end of the over-arm for lateral pivot movement of the needle bar 4. These mechanisms are controlled by means of a code converter placed, for example, in the over-arm.

Figure 2:
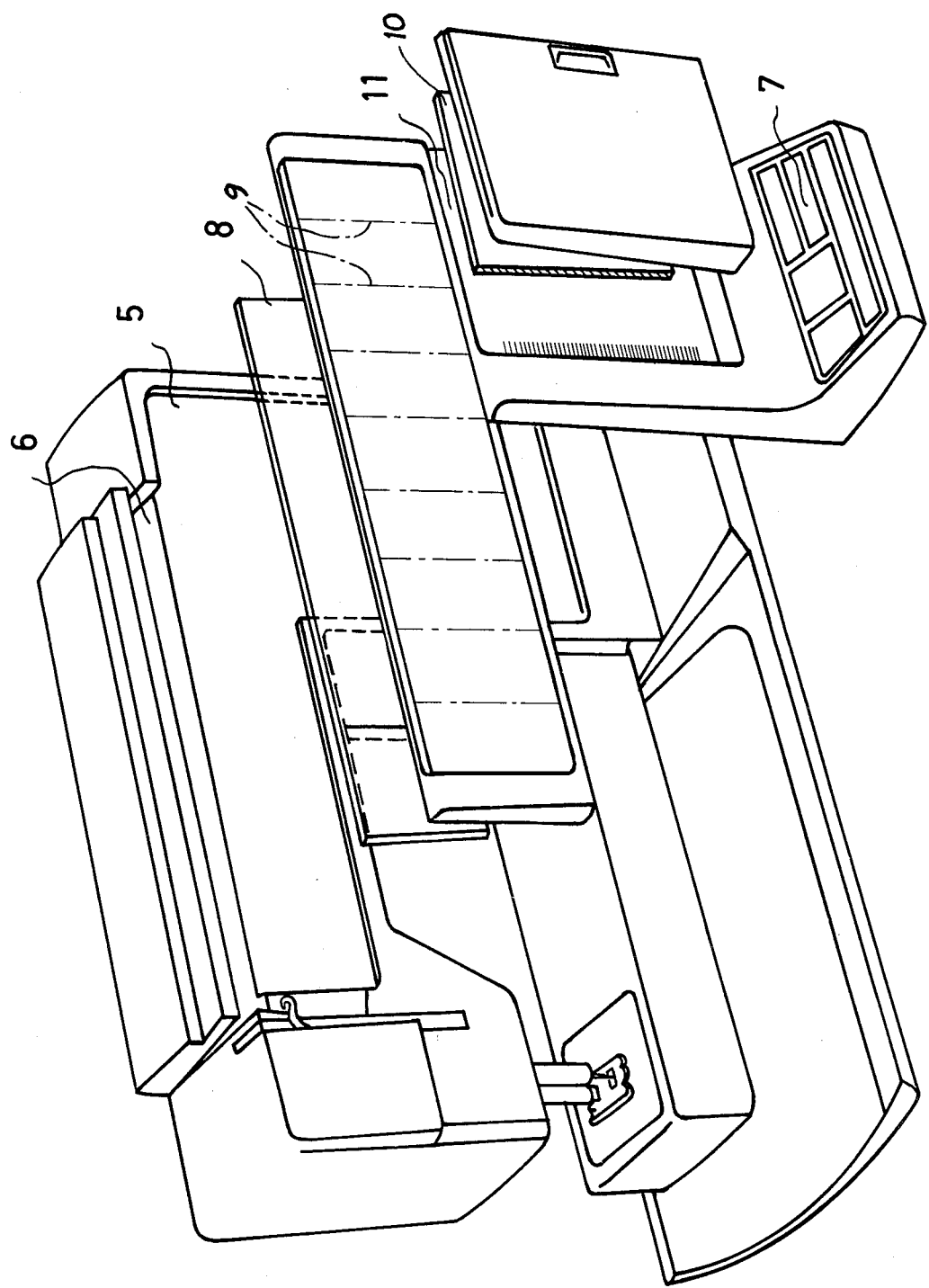
FIG. 2 is an exploded view of the major components of the machine.

In the illustrated embodiment, the electronic part comprises panels on the front side and upper side of the machine. The mechanical part presents recesses 5, 6 in which the electronic part can be fitted when assembled to the machine. The electronic part also comprises a row of units. In FIG. 2 there is shown a program selector, which is externally accessible, in the form of a bank of push buttons 7, a circuit card 8, pattern symbols 9 (FIG. 1) and a memory unit 10. The function of the memory unit in the system is important, since the memory unit 10 is supplementary to the electronic equipment and comprises an independent memory unit. By exchanging the memory unit 10, which is inserted into a recess 11, it is possible to provide the machine with pattern information in the form of data codes to the control means in an indefinite number of variations. One and the same memory unit may contain pattern information for any number of seam patterns whatsoever.

Because of the very wide variations in patterns thus provided, the space provided for the symbols 9 is too small to enable all patterns to be indicated. In practice, it is therefore suitable to use the space for the symbols to indicate the "conventional" seams, plain seams. The "remaining" patterns can then be identified by numbers or the like on the memory unit. As a variant of the invention it is possible to provide plug-in contacts on the unit 10 connecting several circuits of the memory enclosed in the machine.

The described embodiment is an example of how the invention can be realized. The invention is not restricted hereto, however, but can be modified within the scope of the following claims.

What we claim is:

1. A domestic sewing machine having a machine frame comprising a post, arms, and bed, and a memory unit including a code word determining the length of the stitch and being associated with at least one specific seam pattern, the machine including a front panel defining an outer surface of the machine, a recess in said outer surface and connecting means in said recess for said memory unit, said memory unit comprising a plug-in unit detachably mounted in said recess and a further recess in the front portion of the machine frame's over-arm section, said front panel being a separate element from the machine and fitted within said further recess.

* * * * *